(12) United States Patent
Nojima et al.

(10) Patent No.: US 8,197,752 B2
(45) Date of Patent: *Jun. 12, 2012

(54) MANAGING SYSTEM AND METHOD FOR EMISSIONS OF ENVIRONMENTAL POLLUTANTS

(75) Inventors: Masafumi Nojima, Tokai (JP); Takeyuki Itabashi, Hitachi (JP); Takao Ishikawa, Hitachi (JP); Hiroshi Kanemoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 734 days.

This patent is subject to a terminal disclaimer.

(21) Appl. No.: 11/493,800

(22) Filed: Jul. 27, 2006

(65) Prior Publication Data

US 2007/0038388 A1  Feb. 15, 2007

(30) Foreign Application Priority Data

Jul. 29, 2005  (JP) .................... 2005-219855

(51) Int. Cl.
*G01N 21/00* (2006.01)
*G01N 31/00* (2006.01)
*G01N 33/00* (2006.01)
G01F 1/12 (2006.01)
G01F 1/50 (2006.01)
G01F 25/00 (2006.01)
G01L 27/00 (2006.01)
G01R 11/56 (2006.01)
G01R 21/133 (2006.01)
G06F 17/00 (2006.01)

(52) U.S. Cl. ............. 422/62; 702/30; 702/100; 705/412

(58) Field of Classification Search .................... 702/30; 73/23.31; 422/62; 110/346
See application file for complete search history.

(56) References Cited

U.S. PATENT DOCUMENTS

| 5,852,560 | A | 12/1998 | Takeyama et al. |
| 6,681,188 | B2 * | 1/2004 | Sakurai et al. .................. 702/30 |
| 7,805,271 | B2 * | 9/2010 | Nojima et al. ................ 702/100 |
| 2002/0035550 | A1 * | 3/2002 | Sakurai et al. ................ 705/400 |
| 2002/0128749 | A1 * | 9/2002 | Arita et al. .................... 700/286 |
| 2008/0236247 | A1 * | 10/2008 | Nojima et al. ............... 73/23.31 |

FOREIGN PATENT DOCUMENTS

| JP | 10-57936 | 3/1998 |
| JP | 2004-326375 | 11/2004 |
| JP | 2004-362212 | 12/2004 |
| WO | WO 02/46334 | 6/2002 |

* cited by examiner

*Primary Examiner* — Sam P Siefke
*Assistant Examiner* — Bryan Kilpatrick
(74) *Attorney, Agent, or Firm* — Antonelli, Terry, Stout & Kraus, LLP.

(57) ABSTRACT

Managing system for emissions environmental pollutants comprising: a measuring device for measuring a flow rate of a fuel supplied to a customer; an unit emission quantity storage device of environmentally influential substance for storing a unit emission quantity of an environmentally influential substance emitted when an unit flow rate of fuel is manufactured or processed; and an emission quantity computing device of environmentally influential substance for calculating, based on the fuel flow rate measured by the measuring device, and the unit emission quantity of the environmentally influential substance stored by the unit emission quantity storage device, an environmental emission quantity of the environmentally influential substance emitted when the fuel supplied to the customer is manufactured or processed.

9 Claims, 14 Drawing Sheets

FIG. 4

| | QUANTITY OF RAW MATERIALS | | QUANTITY OF PRODUCT | | ENVIRONMENTALLY IN-FLUENTIAL SUBSTANCE A | | ENVIRONMENTALLY IN-FLUENTIAL SUBSTANCE B | |
|---|---|---|---|---|---|---|---|---|
| | FLOW RATE | CALORIE | FLOW RATE | CALORIE | EMISSION LEVEL | EMISSION BASIC UNIT | EMISSION LEVEL | EMISSION BASIC UNIT |
| 1 FUEL A | r | $ra_1$ | R | $Ra_2$ | ... | ... | ... | ... |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |
| 9 | | | | | | | | |
| 10 | | | | | | | | |
| : | | | | | | | | |
| TOTAL | | | | | | | | |

FIG. 8

| NAME OF FUEL | QUANTITY | DATE OF ACCEPTANCE | NAME OF ENVIRON- MENTALLY INFLUENTIAL SUBSTANCE | QUANTITY OF ENVIRON- MENTALLY INFLUENTIAL SUBSTANCE | ... |
|---|---|---|---|---|---|
| GASOLINE | 10000 ℓ | 2005/02/22 | $CO_2$ METHANE ... | 40 kg · $CO_2$ 0 ... | |

FIG. 10

| NAME OF FUEL ~1001 | QUANTITY ~1002 | PRICE ~1003 | DATE OF SALE ~1004 | NAME OF ENVIRON-MENTALLY INFLUENTIAL SUBSTANCE ~1005 | QUANTITY OF ENVIRON-MENTALLY INFLUENTIAL SUBSTANCE ~1006 |
|---|---|---|---|---|---|
| GASOLINE | 50 ℓ | 5600 | 2005/02/22 | $CO_2$ METHANE ... | 40 kg·$CO_2$ 0 ... |

FIG. 12

| ID | NAME OF FUEL | QUANTITY | PRICE | DATE OF SALE | NAME OF ENVIRON-MENTALLY INFLUENTIAL SUBSTANCE | QUANTITY OF ENVIRON-MENTALLY INFLUENTIAL SUBSTANCE |
|---|---|---|---|---|---|---|
| 10003 | HYDROGEN | 50Nm$^3$ | 5600 | 2005/02/22 | $CO_2$ | 40 kg · $CO_2$ |
| 11005 | HYDROGEN | 50Nm$^3$ | 8600 | 2005/02/23 | $CO_2$ | 0 |
| 12000 | HYDROGEN | 100Nm$^3$ | 6600 | 2005/02/23 | $CO_2$ | 20 kg · $CO_2$ |

MANAGING SYSTEM AND METHOD FOR EMISSIONS OF ENVIRONMENTAL POLLUTANTS

CLAIM OF PRIORITY

The present application claims priority from Japanese application serial No. 2005-219855, filed on Jul. 29, 2005, the contents of which is hereby incorporated by references into this application.

BACKGROUND OF THE INVENTION

1. Field of Technology

The present invention relates to managing system and managing method for emission of environmental pollutants.

2. Background of Art

The degradation of the atmospheric environment due to the emission of greenhouse gases represented by carbon dioxide ($CO_2$) has traditionally been a serious social problem. Particularly in recent years, it has been indicated that the increased air temperatures on a global scale affect greenhouse gases, and these effects have been a critical international problem. In recognition of these circumstances, the Kyoto Protocol on preventing global warming was enforced in February 2005 and international agreements on numeric reduction targets for greenhouse gases, on emission quota transactions, on collaborative implementation, on a clean development mechanism, and on other factors were completely implemented. In view of economic growth and the expansion of a demand for electricity, however, it is considered to be very difficult to achieve the numeric reduction targets for greenhouse gases.

Under such a situation, Japanese Application Patent Laid-Open Publication No. 2004-326375 provided a system targeted for companies with $CO_2$ emission installations and facilities such as factories, buildings, and power plants, the system being adapted to compute $CO_2$ emission levels for each company by use of a special computer terminal and manage actual $CO_2$ emissions data on a company-company basis using a server.

Also, Japanese Application Patent Laid-Open Publication No. 2004-362212 provided a technique for reducing $CO_2$ emissions by utilizing the fuel cells that are high in energy production efficiency and do not emit $CO_2$.

[Patent Document 1] JP Kokai No. 2004-326375
[Patent Document 2] JP Kokai No. 2004-362212

SUMMARY OF THE INVENTION

Using $CO_2$ emission data to achieve the proper and thorough management of $CO_2$ at the corporate customer site and distribute the power supplies of the company is effective for reducing $CO_2$ emissions on a worldwide basis. To further reduce global-warming $CO_2$ gas emissions in the society, there is a need to establish a social framework that makes the end customers of energy, that is, general customers, more aware of the importance of environmental protection and urges the end customers to further save energy and to use even cleaner energy more actively. During the processes of mining, transporting, and storing primary energy resources and of manufacturing and supplying fuels, $CO_2$ is constantly emitted and $CO_2$ emission levels significantly vary according to particular process efficiency. In addition, if fuels that are of the same kind and differ in $CO_2$ emission level are mixed, the $CO_2$ emissions of the fuel mixture must be notified to general customers and how to manage these $CO_2$ emissions also becomes important. These problems are not considered in Patent Documents 1 and 2.

In order to solve the above problems, an object of the present invention is to provide managing system and managing method for emission of environmental pollutants enable to assist an acceleration of carbon dioxide emissions reduction. That is, present invention is enable to provide a method of measuring a carbon dioxide emissions reduction level, and a system for assisting carbon dioxide emissions reduction, both the measuring method and the reduction assistance system being adapted so that acceleration of carbon dioxide emissions reduction can be assisted at a managing customer site by quantifying the carbon dioxide and other substances emitted in a particular environment or distributed on a commercial basis, from process device performance, fuel characteristics, and the quantities of raw materials, electricity, gas, and other forms of energy consumed during fuel manufacture.

MEANS FOR SOLVING THE PROBLEMS

It is thus possible to provide a system that manages commercial distribution volumes of carbon dioxide and other environmentally influential substance emissions in accordance with the quantities of raw materials and various forms of energy consumed during the fuel manufacture. This environmentally influential substance emissions management system compiles environmental load data of the various forms of hydrogen manufactured using fuels/manufacturing processes each different in environmental load coefficient such as carbon dioxide emission basic unit, and directly or mixedly distributed on a commercial basis, and then quantifies the environmental loads of the hydrogen at a fuel sales site.

This system for managing the commercial distribution volumes of carbon dioxide and other environmentally influential substance emissions in accordance with the quantities of raw materials and various forms of energy consumed during the fuel manufacture, also includes an environmentally influential substance emissions display device to display names of the environmentally influentially substances emitted from the fuels, environmentally influentially substance emission levels, and other environmental characteristics of the fuels, to a customer. The environmentally influential substance emissions display device also prints data on names of the fuels that the customer has purchased at the fuel sales site, on environmentally influentially substance emission levels equivalent to the quantities of purchase of the fuels, and on other environmental characteristics thereof. The system can thus urge the customer and supplier of the fuels to improve their sense of environmental protection.

In addition, the system that manages the commercial distribution volumes of carbon dioxide and other environmentally influential substance emissions in accordance with the quantities of raw materials and various forms of energy consumed during the fuel manufacture can urge, as a service function, the fuel customer to have a greater sense of environmental protection, by prompting the fuel supplier and customer to set up any environmentally influential emission levels and in accordance with an emission level quantified for the quantity of hydrogen fuel purchased, assigning the number of evaluation points based on fixed judgment criteria.

EFFECTS OF THE INVENTION

Since this managing system and managing method enable to evaluate a customer by its degree of contribution to the environment, the managing system and managing method can enhance the customer's desire to purchase a less environmentally influential fuel. Thus, the supplier also comes to consider reducing costs while at the same time having a greater sense of environmental protection.

BRIEF DESCRIPTION OF THE DRAWINGS

FIG. 4 is a table showing an example of data structure of calculation results in the embodiment 1;

FIG. 8 is a table showing an example of display data in the embodiment 1;

FIG. 10 is a table showing a second example of data structure of calculation results in the embodiment 1;

FIG. 12 is a table showing an example of display data in the embodiment 2;

DETAILED DESCRIPTION OF THE INVENTION

Embodiments of the present invention will be described in detail hereunder with reference to the drawings.

Embodiment 1

Figure 1:
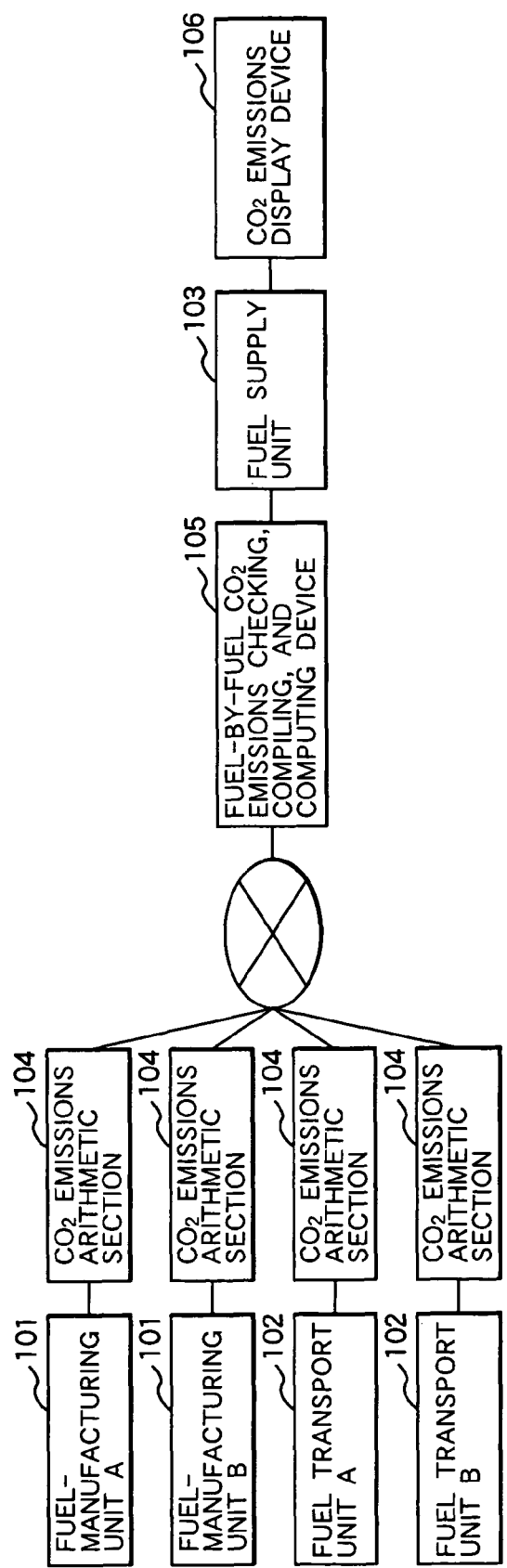
FIG. 1 is a basic configuration diagram showing an environmentally influential substance emissions management system of the embodiment 1 of the present invention.

A description is given below of a basic configuration of an environmentally influential substance emissions management system which is embodiment 1. FIG. 1 shows the environmentally influential substance emissions management system configuration according to the embodiment 1 of the present invention, and a functional configuration of the system. As shown in FIG. 1, environmentally influential substance emissions management system includes fuel-manufacturing units 101, fuel transport units 102, and fuel supply units 103, and each of the three kinds of units, 101, 102, 103, has an environmentally influential substance emissions arithmetic section 104 and a communication line. The fuel (energy source) targeted for here refers to, for example, gasoline, a light fuel oil, kerosene, electricity, a natural gas (city gas), a propane gas, hydrogen, or an organic halide. Also, the environmentally influential substances managed here refer to carbon dioxide ($CO_2$), methane, nitrous oxide ($N_2O$), a tropospheric ozone ($O_3$), a chlorofluorocarbon (CFC) gas, water vapors, and/or the like.

Figure 2:
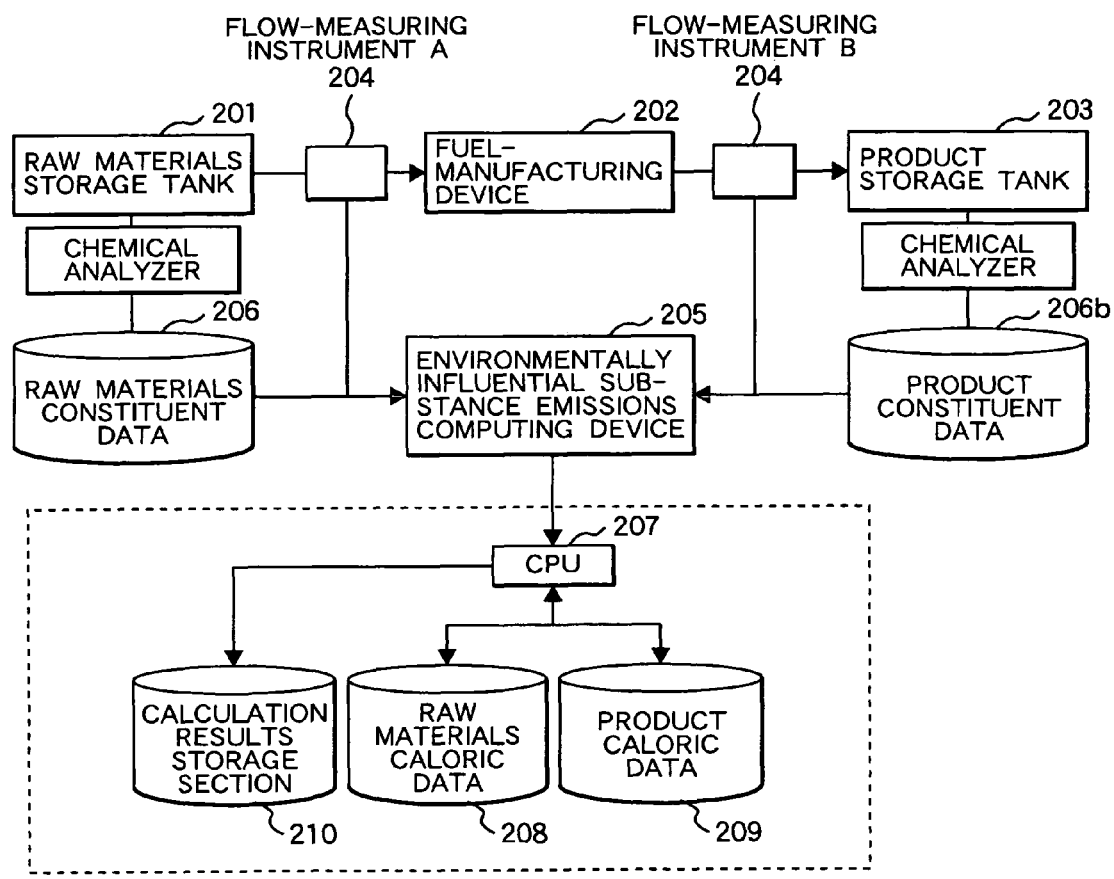
FIG. 2 is a system configuration diagram of the embodiment 1 showing in the FIG. 1.
Figure 3:
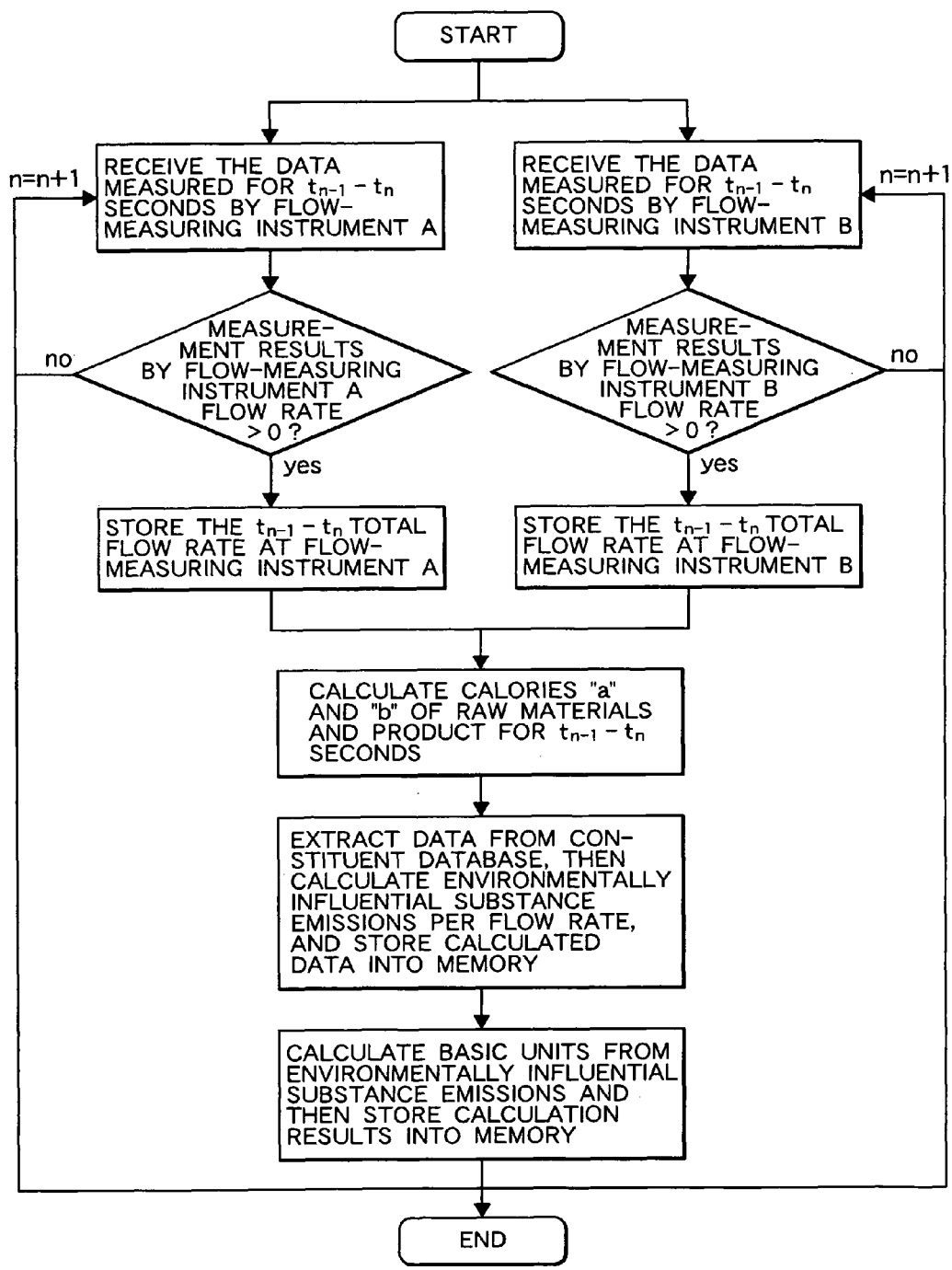
FIG. 3 is a flowchart of environmentally influential substance emissions calculation in the embodiment 1.

As shown in FIG. 2, the environmentally influential substance emissions arithmetic section 104 installed in one fuel-manufacturing unit 101 includes, for example: a raw materials storage tank 201 for storing raw materials; a fuel-manufacturing device 202 for receiving the raw materials from the raw materials storage tank 201 through a pipeline and the like and processing the raw materials into a desired product; a product storage tank 203 for storing the product sent through a pipeline and the like; a flow-measuring instrument 204 that measures the quantities of raw materials supplied to the fuel-manufacturing device 202, and the quantity of product supplied from the fuel-manufacturing device 202 to the product storage tank 203, and can communicate with outside via a cable line or a wireless line; and an environmentally influential substance emissions computing device 205 having a receiver to receive raw materials quantity data and product quantity data from the flow-measuring instrument 204, and calculating environmentally influential substance emissions. Also, a raw materials chemical analyzer for computing environmentally influential substance emissions includes a raw materials constituent database 206 in which environmentally influential substance emission basic units are stored. The environmentally influential substance emissions computing device 205 calculates the environmentally influential substance emissions via a CPU 207 on the basis of raw materials caloric data 208 and product caloric data 209, and stores calculation results into a calculation results storage section 210. The $CO_2$ emissions that the environmentally influential substance emissions computing device 205 has calculated are compiled by a fuel-by-fuel $CO_2$ emissions checking, compiling, and computing device 105, and a $CO_2$ emissions display device 106 displays the compiled $CO_2$ emissions. A flowchart of calculating the environmentally influential substance emissions during fuel manufacture, in this configuration, is shown in FIG. 3. Raw materials are sent to the fuel-manufacturing device 202, and flow rate measurement is started by flow-measuring instruments A, B of 204. The flow-measuring instruments 204 measure flow rates, r, R, per unit time. The measured flow rates are transmitted to the environmentally influential substance emissions computing device 205. The environmentally influential substance emissions computing device 205 receives the information and then calculates calories of the raw materials and the product from memory-stored data (calorie per unit quantity of raw materials, $a_1 MJ/m^3$, and calorie per unit quantity of the product, $a_2 MJ/m^3$). Calculation expressions are shown below.

Raw materials calorie: $r \times a_1$ (MJ),

Product calorie: $R \times a_2$ (J)  (1)

Next, environmentally influential substance quantity $b_1$ per unit quantity of the raw materials, and environmentally influential substance quantity $b_2$ per unit quantity of the product are extracted from the raw materials constituent database mentioned above and a product constituent database 206, 206b, respectively. After the extraction, a net quantity of environmentally influential substances, S, in the fuel-manufacturing device 202 is calculated using the expression shown below. That is, the net quantity of environmentally influential substances, S, is expressed as follows:

$S = r \times a_1 \times b_1 - R \times a_2 \times b_2$ (kg)  (2)

The environmentally influential substance emission basic unit $S_{norm}$ is expressed as follows:

$$S_{norm} = \frac{r \times a_1 \times b_1 - R \times a_2 \times b_2}{R \times a_2} \quad (3)$$

At this time, a manufacturing date of the product can be set by endowing the environmentally influential substance emissions computing device 205 with a clock function. Also, these calculation results are stored, for example, in a table format into the calculation results storage section 210 in FIG. 2, as shown in FIG. 4. The names of the environmentally influential substances, the manufacturing date, and other attributes of the fuels can also be inserted.

The raw materials and product constituent databases 206, 206b usually include approximate data concerning the environmentally influential substance emissions of the raw materials and the product, respectively. Accurate quantities of environmentally influential substances can be constantly incorporated and calculated by providing each of the raw materials and product storage tanks 201, 203 with a chemical analyzer such as a chromatograph, and keeping the emissions data of the environmentally influential substances within the raw materials and the product up-to-date at all times using the chemical analyzer.

The environmentally influential substance emissions arithmetic section 104 installed in one fuel transport unit 101 is basically of the same configuration as for the fuel-manufacturing unit 202.

Figure 5:
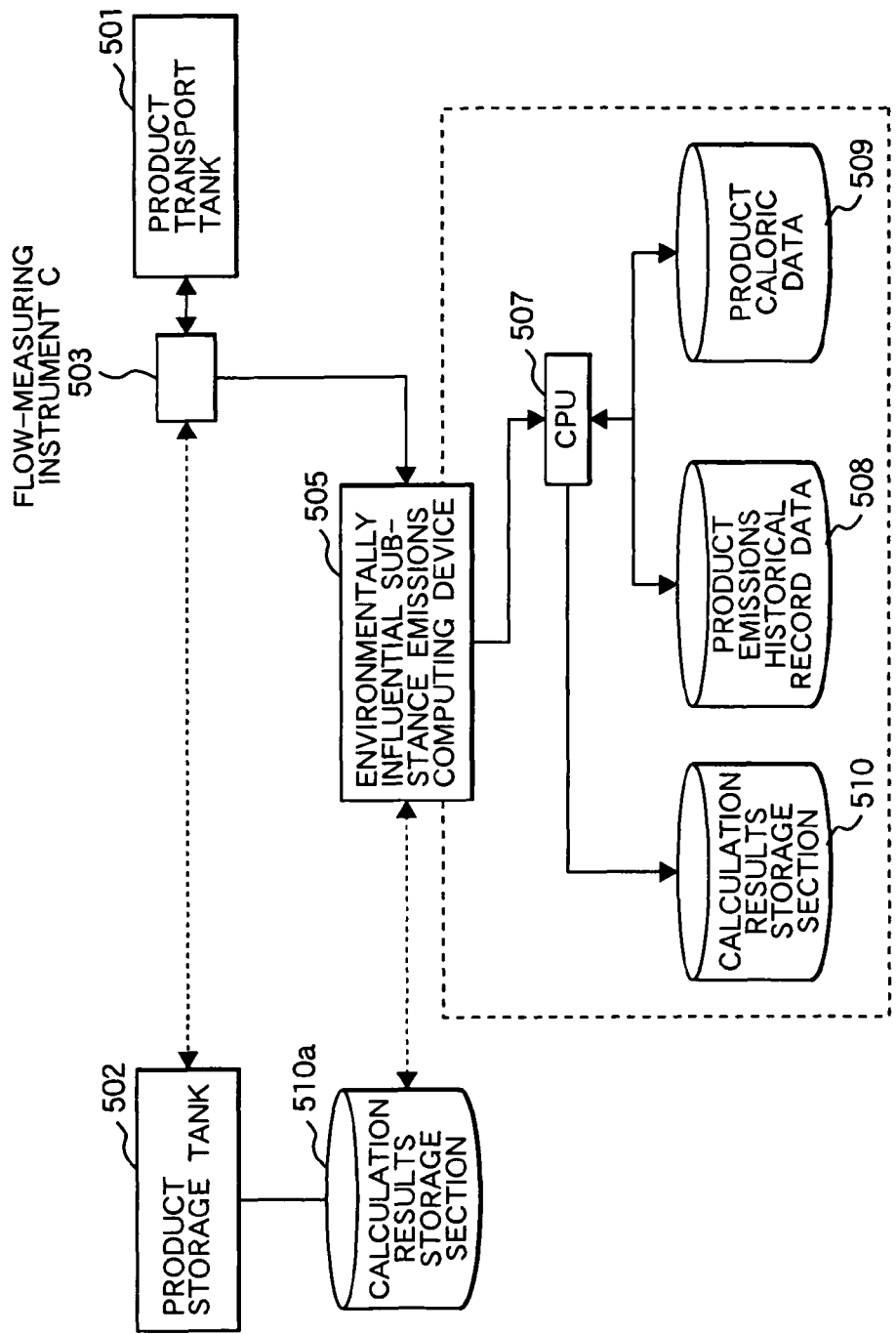
FIG. 5 is a configuration diagram showing an environmentally influential substance emissions arithmetic section of the embodiment 1.

The environmentally influential substance emissions arithmetic section of the fuel transport unit 101 has a product transport tank 501 in the transport unit in order to temporarily store the product, as shown in FIG. 5. This environmentally influential substance emissions arithmetic section also includes: a flow-measuring instrument 503 that measures the quantity of product when the fuel that is the product is transferred from a product storage tank 502 of the fuel-manufacturing unit to the product transport tank 501, and can send measurement results to outside by cable communication or wireless communication; and an environmentally influential substance emissions computing device having an element to receive the measured product quantity data from the flow-measuring instrument 503. The environmentally influential substance emissions arithmetic section further includes a memory for receiving computed data from the environmentally influential substance emissions computing device 505 within the fuel-manufacturing unit. Similarly to the environmentally influential substance emissions computing device 505 within the fuel-manufacturing unit, a transport/acceptance date of the product can be set by endowing the environmentally influential substance emissions computing device 505 with a clock function.

Figure 6:
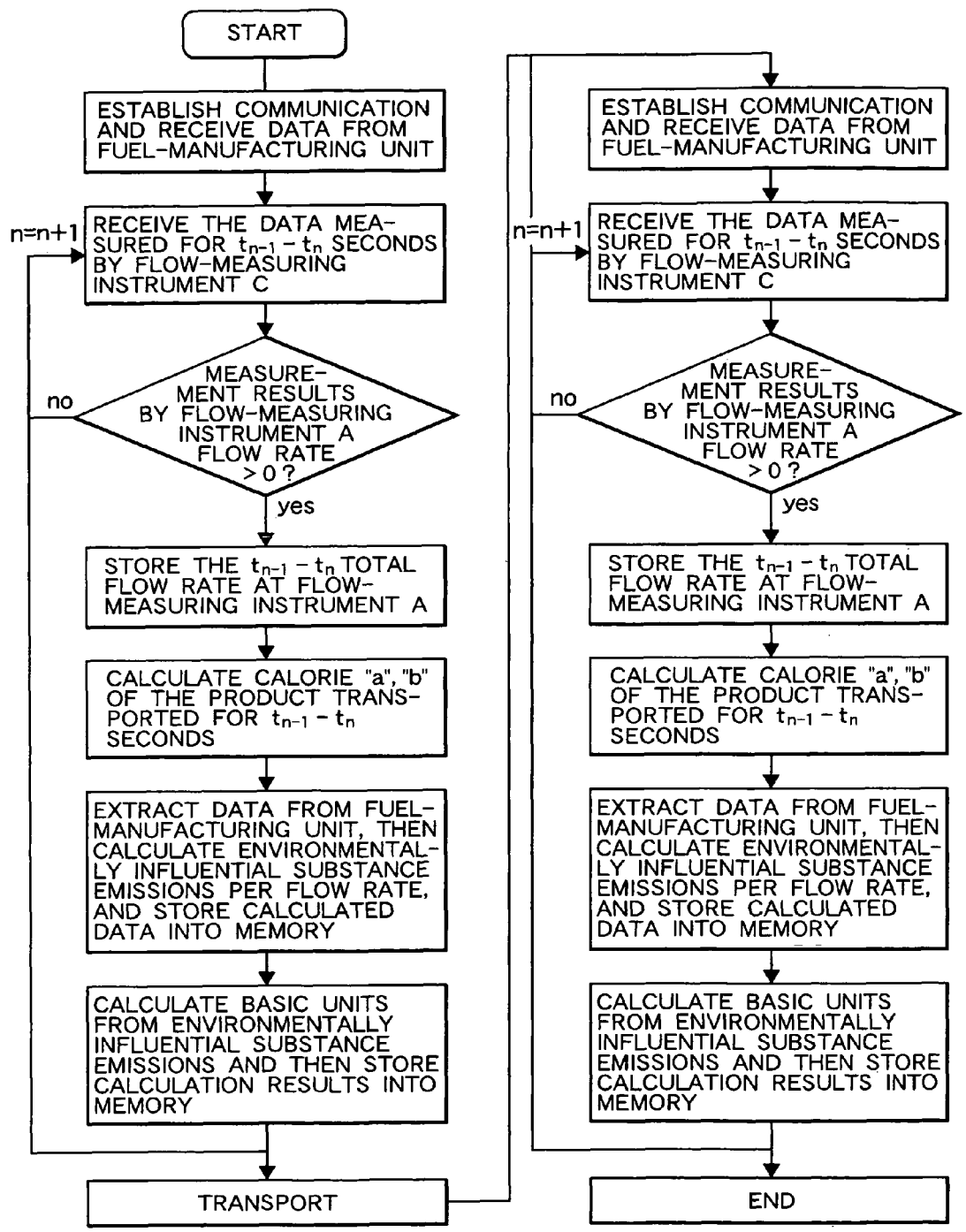
FIG. 6 is a second flowchart of environmentally influential substance emissions calculation in the embodiment 1.

A flowchart of calculating environmentally influential substance emissions during fuel transport, in this configuration, is shown in FIG. 6. First, in FIG. 5, the product tank 501, 502 of the fuel transport unit and that of the fuel-manufacturing unit are interconnected in order to accept the product (fuel) therefrom. At this time, the fuel-manufacturing unit prepares so to be able to exchange information between the environmentally influential substance emissions computing device of the particular fuel-manufacturing unit to the environmentally influential substance emissions computing device 505 of the fuel transport unit by information communication through the flow-measuring instrument 503. For cable communication, a cable is connected to both communication devices. For wireless communication, operations are conducted to establish the wireless communication.

The product is sent to the fuel transport unit, and a flow rate of the product is measured by flow-measuring instrument C of 503. The measured flow rate is transmitted to the environmentally influential substance emissions computing device 505. The environmentally influential substance emissions computing device 505 uses expression 1 to calculate a calorie of the fuel transported, based on the flow rate r of the fuel transported. Also, the flow-measuring instrument C of 503 uses expressions 2, 3 to calculate environmentally influential substance emissions of the fuel transported, and an environmentally influential substance emission basic unit thereof, based on the information that has been transmitted from the fuel-manufacturing unit, and the calorie of the fuel transported. Both calculation results are stored in a table format into the calculation results storage section 510 in FIG. 5, as shown in FIG. 4. Also, the fuel is transferred to a supply destination after being transported thereto.

Figure 7:
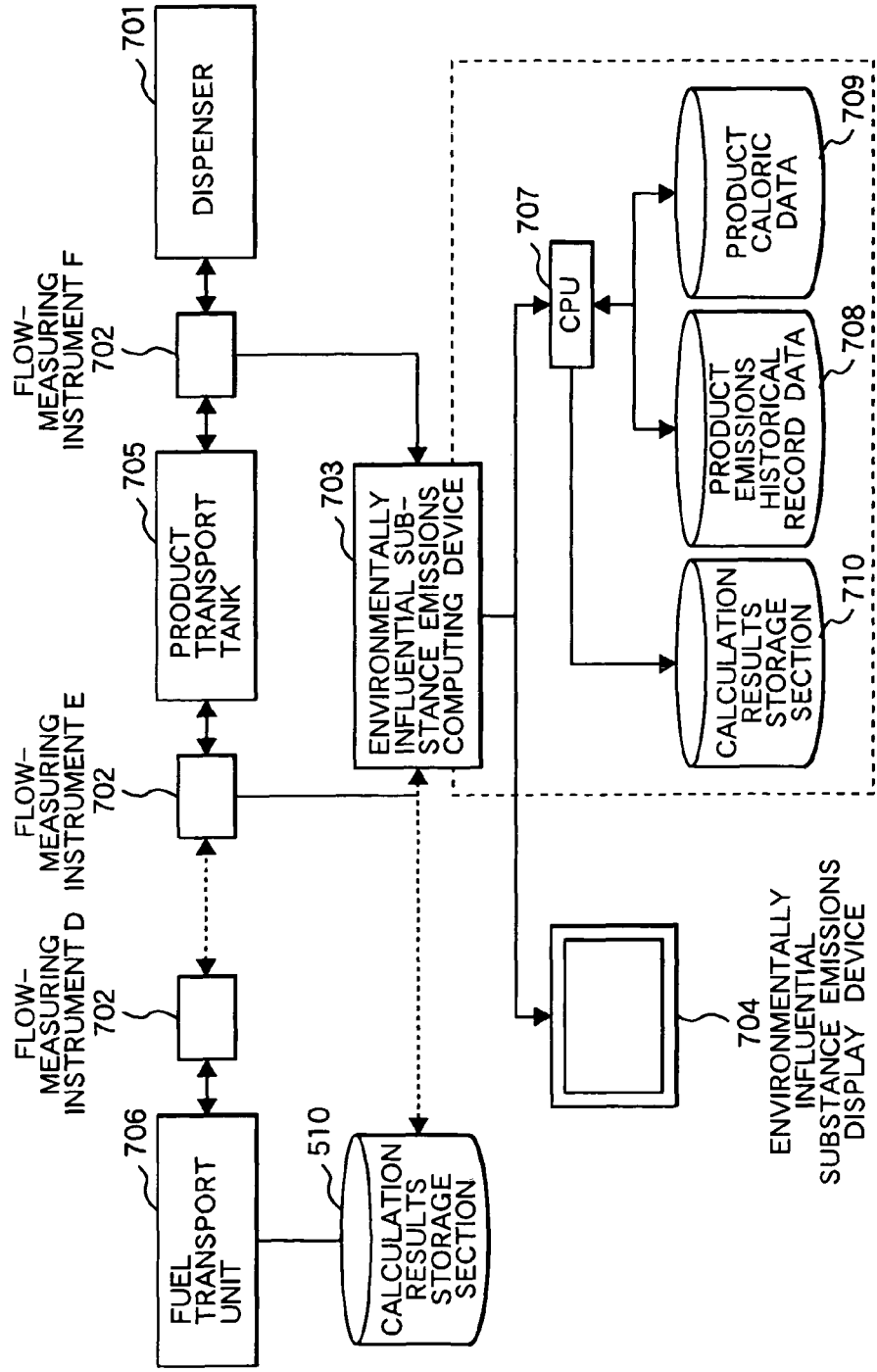
FIG. 7 is a configuration diagram showing a fuel supply unit of the embodiment 1.

In addition to a product transport tank 705 for temporarily storing the product, each fuel supply unit includes, as shown in FIG. 7, a dispenser 701 for supplying the product, a flow-measuring instrument D, E, F of 702, an environmentally influential substance emissions computing device 703, and a display device 704 for displaying the information sent from the environmentally influential substance emissions computing device 703. Additionally, the fuel supply unit includes: another flow-measuring instrument 702 that measures the quantity of product when the fuel that is the product is transferred from a product transport tank 705 of a fuel transport unit to the product storage tank, and can send measurement results to outside by cable or wireless communication; and an environmentally influential substance emissions computing device 703 having an element to receive the measured product quantity data from the flow-measuring instrument 702. The fuel supply unit further includes a memory for receiving computed data from the environmentally influential substance emissions computing device of fuel transport unit 706.

Fuel transfer from the fuel transport unit 706 to the fuel supply unit uses the same procedure as that shown in the flowchart of FIG. 6 relating to fuel transfer from the product-manufacturing unit to the fuel transport unit. The flow-measuring instrument for measuring a flow rate of the fuel sent from the transport unit 706 can be either the same flow-measuring instrument as that shown in FIG. 6, or any other type of instrument. If any other type of instrument is used, a plurality of flowmeters, including the particular instrument, need to share the environmentally influential substance emissions computing device 703. Not only fuel leakage during fuel transport, but also a loss of the fuel due to volatilization thereof can thus be quantitatively detected. The fuel supply unit stores the quantity of fuel accepted from the fuel transport unit 706, environmentally influential substance emissions, and an environmentally influential substance emission basic unit, into an internal memory of the environmentally influential substance emissions computing device 703. At this time, the display device 704 can display the information stored in the memory. The display device 704 can make this display in the form of, for example, monitor display or printed-matter display. Similarly to the environmentally influential substance emissions computing device within the fuel-manufacturing unit, a supply/acceptance date of the product can be set by endowing the environmentally influential substance emissions computing device 703 with a clock function. For example, as shown in FIG. 8, names and emission levels of environmentally influential substances can be displayed for each kind of accepted fuel. In addition, a manufacturing date, an acceptance date, and other information can be displayed.

Figure 9:
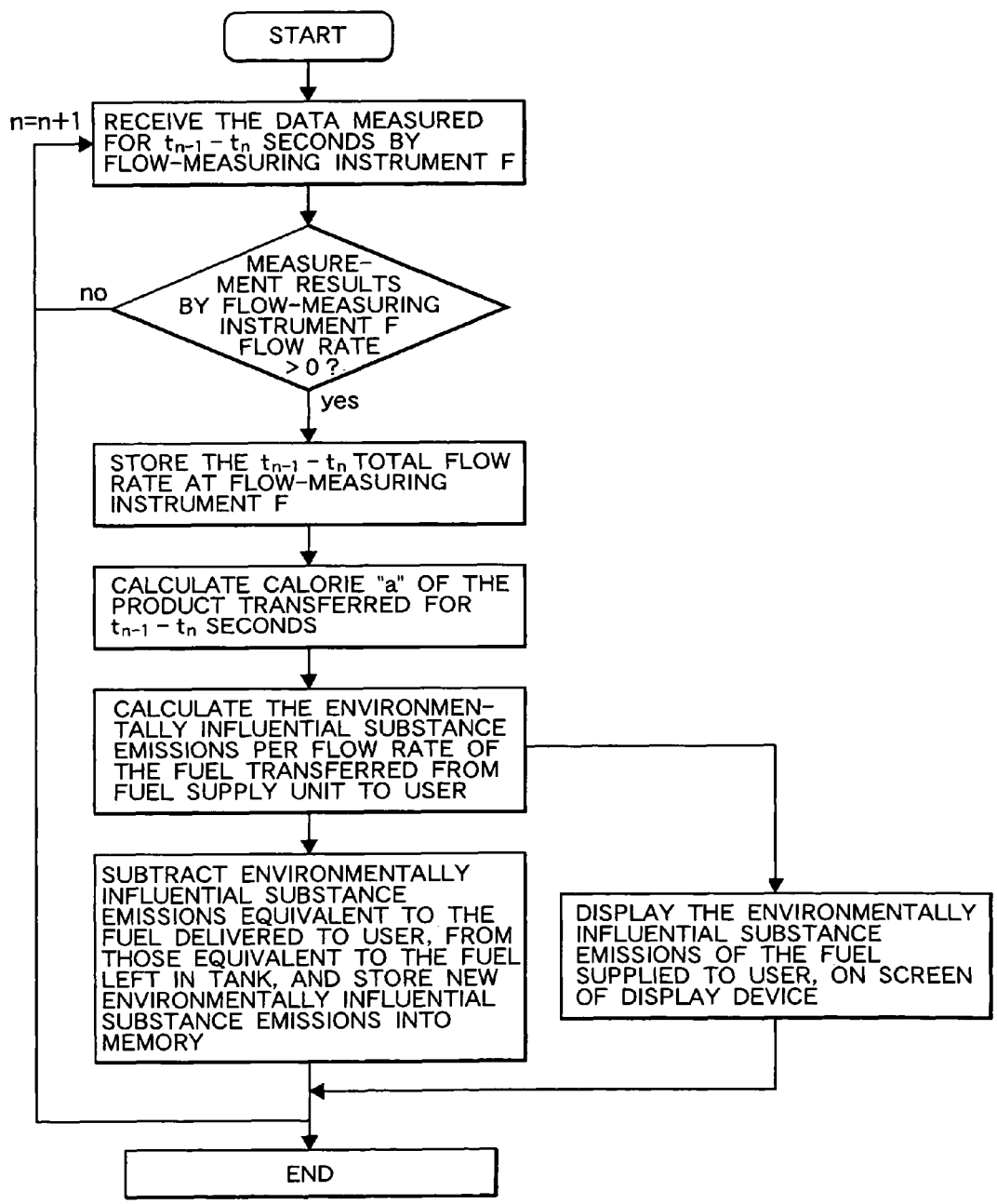
FIG. 9 is a third flowchart of environmentally influential substance emissions calculation in the embodiment 1.

When the fuel is delivered from the fuel supply unit to a customer, the delivery is conducted through the dispenser 701. At this time, in accordance with a flowchart of FIG. 9, a flow rate of the fuel supplied to the customer through the dispenser 701 is measured by a flow-measuring instrument F of 702 and environmentally influential substance emissions equivalent to the flow rate are calculated by the environmentally influential substance emissions computing device 703. After the calculation of the environmentally influential substance emissions, a name of the sold fuel, 1001, the quantity of sold fuel, 1002, a sales charge 1003, a date of sale, 1004, a name of each environmentally influential substance contained in the sold fuel, 1005, an environmentally influential substances content 1006, and other information can be displayed on a monitor as shown in FIG. 10. Thus, environmental characteristics of the fuel can be notified to the customer who purchases the fuel. The above information can also be entered on a receipt and displayed to the customer. After part of the fuel in the product storage tank has been delivered to the customer, the total quantity of environmentally influential substances in the storage tank correspondingly changes. The residual total quantity of environmentally influential substances that is equivalent to the delivery of the fuel to the customer is therefore subtracted from the environmentally influential substances content data of the fuel, previously stored in a product emissions data storage region of the environmentally influential substance emissions computing device 703. Data on the residual total quantity of environmentally influential substances of the fuel is then newly saved in the product emissions data storage region 708.

Also, in order to motivate customers to purchase a less environmentally influential fuel, storing independent data for each customer onto an IC card or an RFID tag, or into an internal memory of a motor vehicle or the like, as shown in FIG. 10, makes it possible to periodically evaluate the customer by its degree of attention to the environment and provide a financial incentive and/or a service according to particular evaluation results.

In addition, under a system in which a penalty will occur if an emission level of a substance emitted in the environment exceeds a fixed value, the above information can be provided to the customer, only in that case.

Use of the above-described technique makes it possible to notify environmentally influential substance emissions to the energy supplier and the energy customer by managing the environmentally influential substances within the fuel, and the emissions of the environmentally influential substances, quantifying the emission thereof, and displaying the emission levels thereof.

Embodiment 2

Next, an embodiment for selling a fuel mixture, based on the basic configuration of the environmentally influential substance emissions management system according to the embodiment 1, will be described hereunder as a second embodiment. The present embodiment is particularly effective for secondary energy obtainable by processing a primary energy resource such as hydrogen. The present embodiment is also effective for mixing hydrogen and methane and supplying the mixture to a customer. Hydrogen is known as a clean energy resource usually not emitting an environmentally influential substance. However, since hydrogen is an energy resource not existing in the natural world, this substance eventually emits carbon dioxide and other environmentally influential substances during manufacturing processes.

Figure 11:
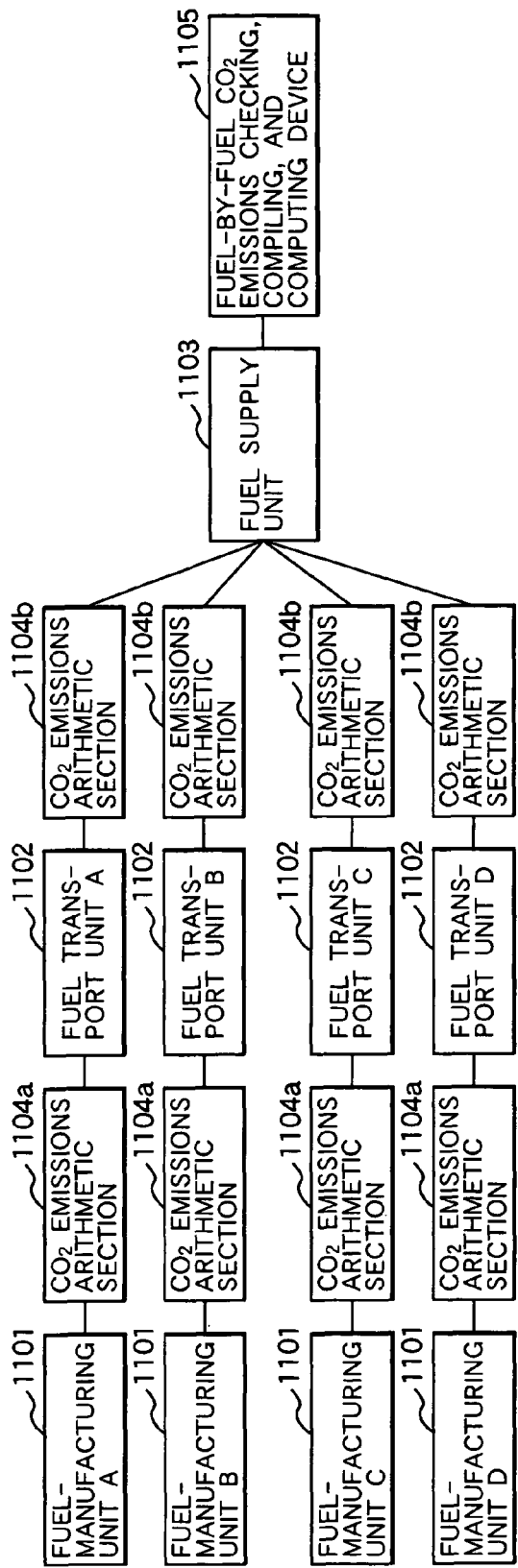
FIG. 11 is a configuration diagram showing an environmentally influential substance emissions management system of the embodiment 2 of the present invention.

In this embodiment, the basic configuration of the embodiment 1 is used, as shown in FIG. 10, fuels that are the same in physical properties but differ in the kinds and emission levels of environmentally influential substances may each be manufactured using multiple manufacturing units, accepted by one supplier through multiple transport units, stored into one tank, and supplied to a customer. In such a case, the quantity of each environmentally influential substance is managed as described below. In the embodiment 1, fuels are managed by respective names. In this embodiment, however, each fuel has an assigned ID number and is managed as in FIG. 11. Thus, one fuel can be distinctly or uniquely managed. IDs are issued during the data exchange conducted when each fuel is transferred from a fuel-manufacturing unit 1101 to a fuel transport unit 1102. For mixing multiple fuels during transfer of each fuel from the fuel transport unit 1102 to a fuel supply unit 1103, a new ID number is issued for the fuel mixture. In this case, for example, the new fuel fed into a tank has an ID, the fuel already existing in the tank has another ID, and the fuel mixture has a newly issued different ID. The three IDs are correlated to one another and incorporated into a table as shown in FIG. 12, and the table is stored into a memory of an environmentally influential substance emissions computing device provided in the fuel supply unit 1103. If, prior to the above mixing, environmentally influential substance emissions and emissions basic units of the mixed fuels are calculated by summing the environmentally influential substance emissions of the fuels existing before being mixed, or by averaging the emissions basic units of the fuels existing before being mixed, the environmentally influential substance emissions computing device conducts the calculations and correspondingly updates memory information.

According to the present embodiment, even if a fuel extremely inexpensive and inferior in environmental characteristics, and a fuel extremely expensive and excellent in environmental characteristics are sold in mixed form, the environmental characteristics of the fuel mixture can be clearly notified to the customer.

Embodiment 3

Next, an embodiment relating to hydrogen which is processed during a supply phase of a fuel will be described hereunder. The present embodiment assumes that the hydrogen is either supplied after being processed into high-pressure hydrogen at a supply site of the fuel by pressurization, or supplied in the form of an organic halide obtained by adding the hydrogen to an aromatic compound.

Figure 13:
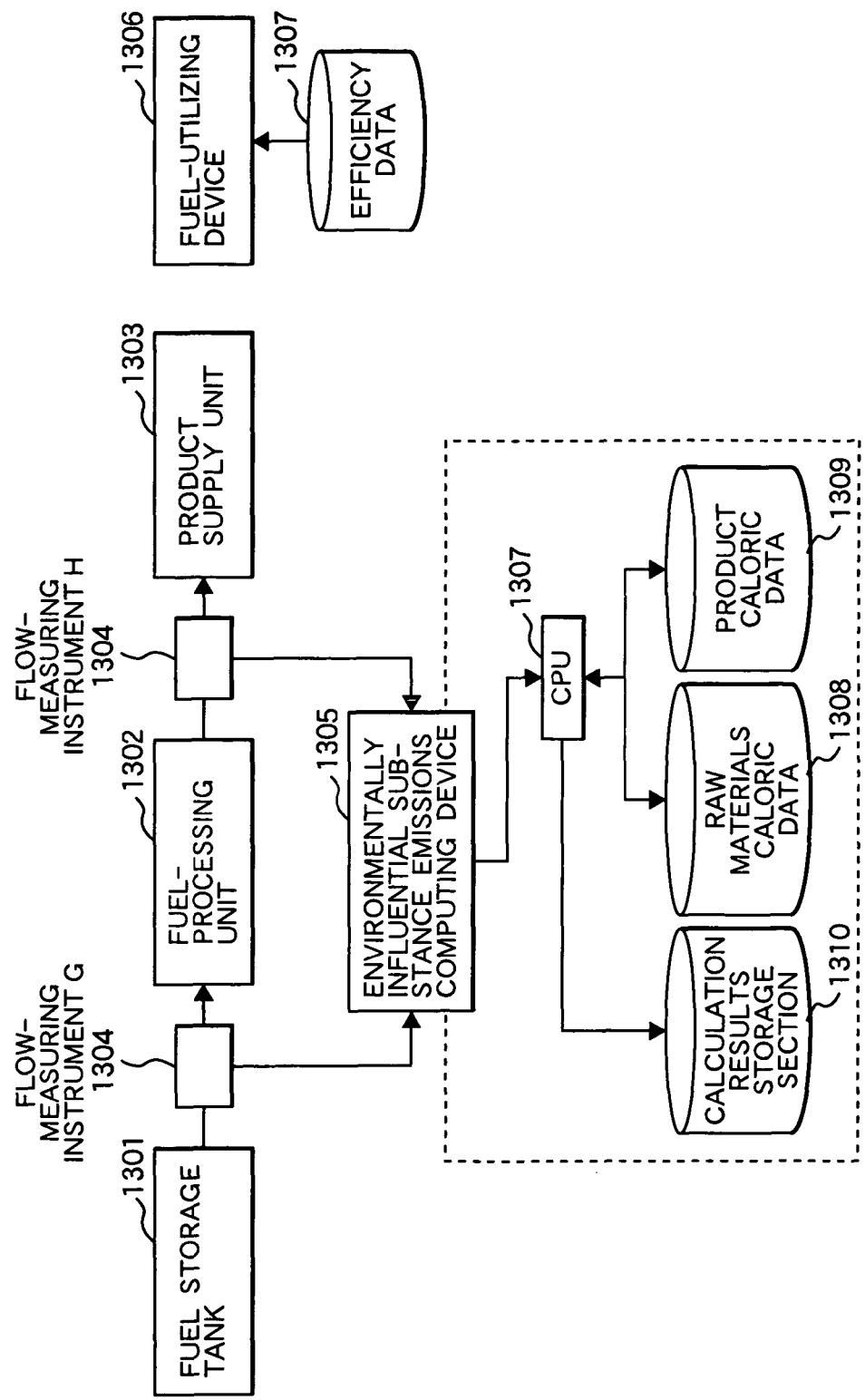
FIG. 13 is a system configuration diagram of the embodiment 3 of the present invention.

As shown in FIG. 13, a system configuration in the present embodiment includes, for example: a fuel storage tank 1301 for storing the fuel; a fuel-processing unit 1302 for receiving the fuel from the fuel storage tank 1301 through a pipeline or the like and processing the fuel into any product; a product supply unit 1303 for supplying the product through a pipeline or the like; two flow-measuring instruments G, H of 1304, one for measuring the quantity of fuel supplied, and the other for measuring the quantity of product supplied from the fuel-processing unit 1302 to the product supply unit 1303, and the flow-measuring instruments G, H of 1304 each being capable of communicating with outside via a cable line or a wireless line; and an environmentally influential substance emissions computing device 1305 having a receiver to receive fuel quantity data and product quantity data from the flow-measuring instruments G, H of 1304, and calculating environmentally influential substance emissions.

Figure 14:
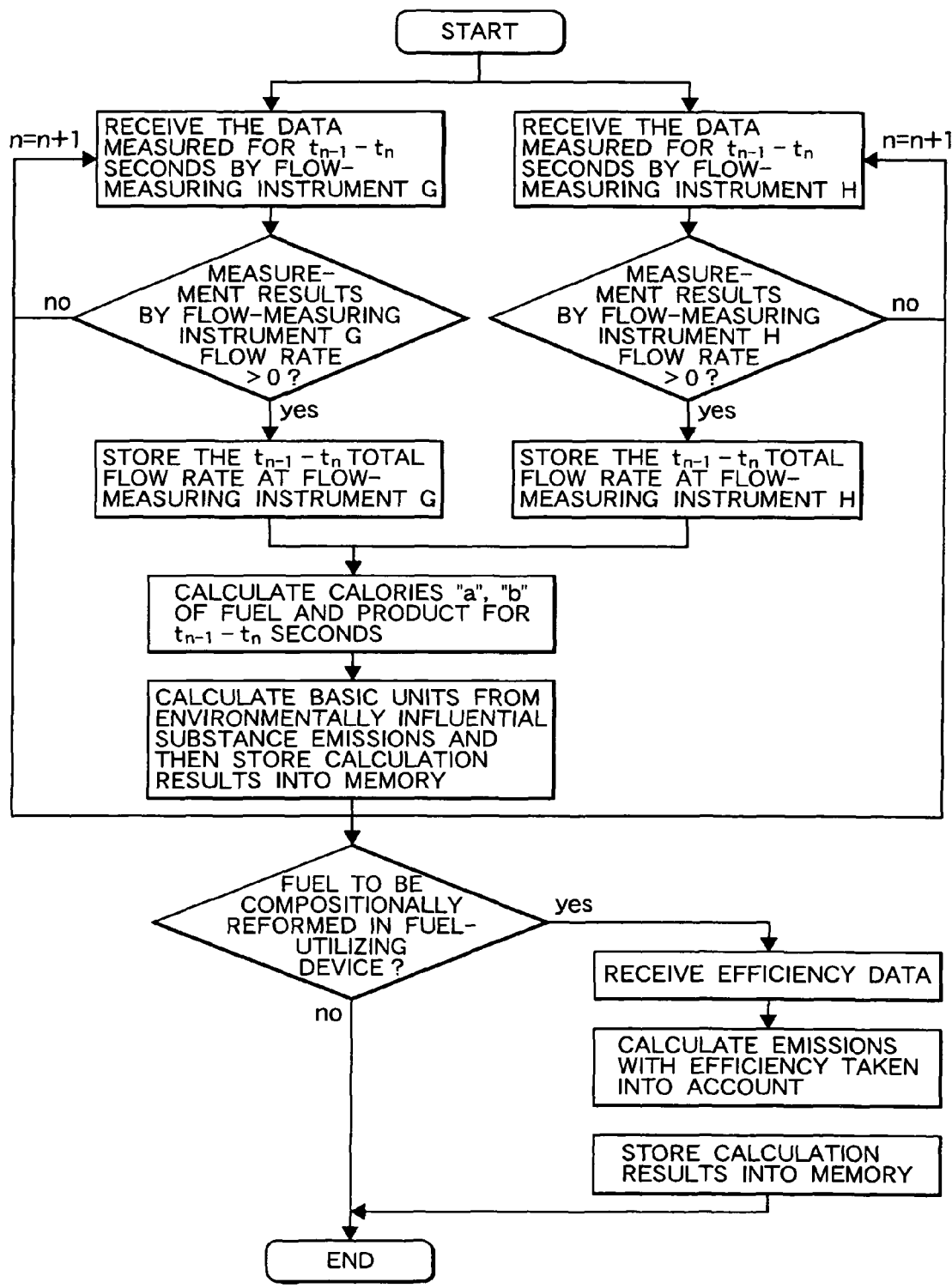
FIG. 14 is a flowchart of environmentally influential substance emissions calculation in the embodiment 3.

The environmentally influential substance emissions computing device 1305 also includes a raw materials constituent database in which environmentally influential substance emission basic units are stored. A flowchart of calculating environmentally influential substance emissions of the fuel during manufacture thereof, in this configuration, is shown in FIG. 14. The fuel is sent to a fuel-manufacturing unit, and flow rate measurement is started by flow-measuring instruments G, H of 1304.

The flow-measuring instruments G, H of 1304 measure flow rates, r, R, per unit time. The measured flow rates are transmitted to the environmentally influential substance emissions computing device 1305. The environmentally influential substance emissions computing device 1305 receives the information and then calculates calories of both the fuel and the product from memory-stored data. The calculations are conducted using expression (1).

Next, environmentally influential substance quantity $b_3$ per unit quantity of the fuel is extracted from the memory of the environmentally influential substance emissions computing device 1305. Also, if environmentally influential substance quantity per unit quantity of the product is taken as $b_4$, only the form of the fuel only changes and $b_3 = b_4$ holds. A net quantity of environmentally influential substances in the fuel-manufacturing device, and an environmentally influential substance emissions basic unit are calculated using expressions (2) and (3).

At this time, a manufacturing date of the product can be set by endowing the environmentally influential substance emissions computing device 1305 with a clock function. Also, results of the above calculations are stored, for example, in a table format into a calculation results storage section 1310 in FIG. 13, as shown in FIG. 4. The names of the environmentally influential substances, the manufacturing date, and other attributes of the fuel can also be inserted.

In addition, supplying an organic halide involves reforming a composition of the fuel during a start of vehicle driving or of electric power generation in a household, prior to utilization of the fuel. The fuel supplier, therefore, needs to know efficiency of a customer's fuel-utilizing device in advance.

To achieve this, performance data on fuel-utilizing device 1306 which the customer owns requires separate storage into the environmentally influential substance emissions computing device 1305 or a database connectable thereto. Also, the connectable database needs to be provided in the fuel-utilizing device 1306 or in part of a tank or pipeline used to supply the fuel to the fuel-utilizing device 1306. In addition, the database is desirably accessible by cable or wireless communication.

During environmentally influential substance emissions computation at up to the fuel-utilizing device 1306, as shown in FIG. 14, when the fuel supplier supplies the fuel to the customer, data on the fuel-utilizing device 1306 is extracted from an efficiency database 1307 and environmentally influential substance emissions S are calculated using the following expression:

$$S = R \times a_2 \times b_3 - R(1 - p/100) \times a_2 \times b_4 \quad (4)$$

where p denotes the efficiency of the utilizing device. Likewise, environmentally influential substance emissions basic unit $S_{norm}$ is represented by the following expression:

$$S_{norm} = \frac{r \times a_1 \times b_1 - R(1 - p/100) \times a_4 \times b_4}{R(1 - p/100) \times a_4} \quad (5)$$

After the calculation of the environmentally influential substance emissions, a name of the sold fuel, the quantity of sold fuel, a sales price, a date of sale, a name of each environmentally influential substance contained in the sold fuel, and other information can be displayed on a monitor as shown in FIG. 10. Thus, environmental characteristics of the fuel can be notified to the customer who purchases the fuel.

The present embodiment makes it possible to quantify the environmentally influential substances emitted from the fuel when the fuel is processed at a stage immediately preceding the supply unit or when the customer reforms the composition of the fuel. As a result, the environmental characteristics of the fuel can be clearly notified to the customer.

The present invention can likewise be embodied by making a computer execute the method of the above embodiment in accordance with a program.

Other embodiments of the present invention are itemized below.

(1) An environmentally influential substance emissions management system that quantifies emission of carbon dioxide and other environmentally influential substances during fuel manufacture and manages the quantified information; in which system, when the environmentally influential substance emissions or environmentally influential substance emission basic units are quantified from the quantities of raw materials each of a different environmental load coefficient such as a carbon dioxide emission basic unit, and from the quantity of fuel (that is, product) obtained during the fuel manufacture by using process steps different in fuel-manufacturing efficiency, and the product is commercially distributed in a mixed condition with another product obtained using other process steps, environmentally influential substance emissions of the distributed product mixture are compiled and an environmental load is quantified as an equivalent to the product sold to a customer at a fuel sales site.

(2) An environmentally influential substance emissions display device in a system which quantifies emission of carbon dioxide and other environmentally influential substances during fuel manufacture and manages the quantified information; in which system, the environmentally influential substance emissions display device displays the information obtained in above item (1), for example, names of the fuels, names of the environmentally influential substances emitted during process steps up to supply of the fuels, environmentally influential substance emissions or environmentally influential substance emission basic units equivalent to the quantities of supplied fuels, and presents information on the environmentally influential substance emissions or environmentally influential substance emission basic units of the fuels sold to/purchased from a supplier and customer thereof.

(3) An environmentally influential substance emissions display device in a system which quantifies emission of carbon dioxide and other environmentally influential substances during fuel manufacture and manages the quantified information; in which system, when a customer purchases a fuel at a fuel sales site, the environmentally influential substance emissions display device prints the information obtained in above item (1), for example, a name of the fuel, names of the environmentally influential substances emitted during process steps up to supply of the fuel, and environmentally influential substance emissions equivalent to the quantity of supplied fuel, and presents information on the environmentally influential substance emissions equivalent to the fuel sold to/purchased from a supplier and customer thereof.

(4) The environmentally influential substance emissions management system of above item (1), adapted to quantify emission of carbon dioxide and other environmentally influential substances during fuel manufacture and manages the quantified information; in which system, when environmentally influential substance emissions or environmentally influential substance emission basic units during each process step are quantified, the environmentally influential substance emissions or the environmentally influential substance emission basic units are quantified with consideration being given not only to the quantities of indirect energy, for example, the electric power, gas, and other forms of energy consumed in the manufacturing process steps during operation of fuel-manufacturing devices which undertake the process steps, but also to the quantity of gasoline or any other fuel used to operate a transport motor vehicle in a transport process step.

(5) An environmentally influential substance emissions management system that quantifies emission of carbon dioxide and other environmentally influential substances during fuel manufacture and manages the quantified information, the system including: an environmentally influential substance emissions calculator that calculates the environmentally influential substance emissions existing during the manufacture of the fuel, by using a flow rate of the fuel flowing through a pipeline disposed to supply the fuel to a transport tank; a transmitter which, after the environmentally influential substance emissions existing during the manufacture of the fuel have been calculated by the environmentally influential substance emissions calculator, transmits the calculated environmentally influential substance emissions; and an environmentally influential substance emissions storage device disposed at the transport tank side in order to store the environmentally influential substance emissions existing during the manufacture of the fuel, wherein the emissions have been transmitted by the transmitter.

(6) The environmentally influential substance emissions management system of above item (5), including: a transmitter which, in order to confirm leakage or unauthorized use of the fuel during transport thereof by a transport element, assigns an ID number or any other fuel identification information to the fuel manufactured, and transmits, from a manufacturer of the fuel to a supply destination as well, information inclusive of, in addition to the quantity of transport of the fuel during the manufacture thereof, environmentally influential substance emissions equivalent to the quantity of transport; and a computing device that uses the fuel identification information to check the fuel carried by the transport element, against fuel information on the supply destination, at the supply destination, and computes a differential between the quantity of transport and that of acceptance, and the environmentally influential substance emissions.

(7) A fuel purchase system in a system which quantifies emission of carbon dioxide and other environmentally influential substances during fuel manufacture and manages the quantified information, the fuel purchase system including a function for a plurality of manufacturers to transmit information inclusive of environmentally influential substance emissions and costs of the respective fuels manufactured, a function for a supplier of the fuels to receive transmitted information, and a function for the supplier to store and display received information; the fuel purchase system further enabling the supplier to purchase desired fuels from the respective manufacturers by selecting the fuels and transmitting selection results to each manufacturer.

(8) The fuel purchase system of above item (7), adapted to assist the fuel supplier in fuel purchase by providing to the supplier a database inclusive of environmental tax data and global warming coefficient data and setting up a certain object function to minimize costs as well as to minimize environmental pollution.

(9) A system and apparatus for managing environmentally influential substance emissions, wherein names of environmentally influential substances associated with the quantity of hydrogen fuel which a supplier sells a customer, and quantified emissions are stored onto a magnetic recording card or an IC card or into a motor vehicle or an internal memory thereof.

(10) The system of any one of above items (1) to (9), wherein: the fuel or at least one fuel is, for example, gasoline, a light fuel oil, kerosene, electricity, a natural gas (city gas), a propane gas, hydrogen, or an organic halide; and the environmentally influential substances include carbon dioxide ($CO_2$), methane, nitrous oxide ($N_2O$), a tropospheric ozone ($O_3$), a chlorofluorocarbon (CFC) gas, water vapors, and/or oxide sulfide (SOx).

(11) The environmentally influential substance emissions management system of above item (1), wherein the environmentally influential substance emissions are managed using: a memory and database for storing constituent data of the fuels; a fuel-measuring instrument for measuring the quantities of raw materials of each fuel and the quantity of fuel; an environmentally influential substance emissions computing device for computing environmentally influential substance emission levels from the constituent data, from the quantities of raw materials of each fuel, and from the quantity of fuel; and a communication element for rendering data exchangeable between the fuel-measuring instrument and the environmentally influential substance emissions computing device.

(12) The environmentally influential substance emissions management system of above item (11), wherein the environmentally influential substance emissions computing device includes: a communication element for enabling communication between the constituent database and the fuel-measuring instrument; a raw materials calorie database in which a calorie per unit quantity of fuel is stored; a CPU that conducts computations based on transmitted data; and a database and memory for storing CPU-computed data.

(13) A system which quantifies emission of carbon dioxide and other environmentally influential substances during fuel manufacture and manages the quantified information, the system including: a function that uses a sensor or the like to monitor the quantities of raw materials, environmentally influential substances content information, the quantity of indirect energy input, the quantity of product, and other information; a database for storing data measurements on sensor-monitored data and information; a computing function that extracts sensor data measurements from the database and computes environmentally influential substance emissions of the fuel; and a database for storing computed data.

(14) A system which quantifies emission of carbon dioxide and other environmentally influential substances during fuel manufacture and manages the quantified information, in which system: for example, when a fuel such as an organic halide is handled, the system, if installed at a fuel supplier, stores performance data, such as efficiency, of a fuel-utilizing device which a customer separately possesses, into either an internal memory of an environmentally influential substance emissions computing device, the fuel-utilizing device, or a database provided on part of a tank or pipeline which supplies the fuel to the fuel-utilizing device, and then the system calculates the environmentally influential substances emitted from the customer side.

What is claimed is:

1. A managing system for managing emissions of environmental pollutants, in which fuel manufactured using multiple fuel-manufacturing devices is accepted by one supplier through multiple transport devices and stored into one tank, and supplied to a customer, comprising:

a first measuring device for measuring a flow rate of a raw material of fuel supplied to each fuel-manufacturing device;

a second measuring device for measuring a flow rate of a fuel, which is manufactured in the each fuel-manufacturing device;

a first storage device for storing calories per unit quantity of a raw material and a fuel and environmentally influential substance emissions per unit quantity of a raw material and a fuel;

a first emission quantity computing device for calculating an environmentally influential substance emissions emitted when the fuel is manufactured or processed by the each fuel-manufacturing device and an environmentally influential substance emission basic unit, based on the raw materials flow rate measured by the first measuring device and the fuel flow rate measured by the second measuring device, and of the calories per unit quantity of a raw material and a fuel and the environmentally influential substance emissions per unit quantity of a raw material and a fuel stored by the first storage device;

a second storage device for storing a calculation result calculated by the first emission quantity computing device;

a third measuring device for measuring a flow rate of fuel supplied to a product transport tank in the each transport device;

a fourth measuring device for measuring a flow rate of fuel supplied from the product transport tank in the each transport device to a product storage tank;

a second emission quantity computing device for calculating an environmentally influential substance of the fuel supplied to the product storage tank, based on the fuel flow rate measured by the third measuring device and the fuel flow rate measured by the fourth measuring device, and the emission quantity data of the environmentally influential substance stored by the second storage device; and a third storage device for storing a calculation result calculated by the second emission quantity computing device.

2. The managing system according to claim 1, wherein the environmental influential emission quantity is carbon dioxide.

3. The managing system according to claim 1, further comprising a display for displaying, or a printer for printing, the environmental emission quantity calculated by the emission quantity computing device.

4. The managing system according to claim 3, further comprising a sales date/time storage device to save data on a date of sale of the fuel to the customer.

5. A managing method for managing emissions of environmental pollutants, in which fuel manufactured using multiple fuel-manufacturing devices is accepted by one supplier through multiple transport devices and stored into one tank, and supplied to a customer, comprising:

measuring a flow rate of a raw material of fuel supplied to each fuel-manufacturing device, by using a first measurement device;

measuring a flow rate of a commercial fuel, which is manufactured in the each fuel-manufacturing device, and supplied to a customer from the fuel-manufacturing device, by using a second measurement device;

storing calories per unit quantity of a raw material and a fuel and environmentally influential substance emissions per unit quantity of a raw material and a fuel;

calculating an environmentally influential substance emissions emitted when the fuel is manufactured or processed by the each fuel-manufacturing device by using a first emission quantity computing device and an environmentally influential substance emission basic unit, based on the raw material flow rate measured by the first measurement device and the fuel flow rate measured by the second measurement device, and the calories per unit quantity of a raw material and a fuel and the environmentally influential substance emissions per unit quantity of a raw material and a fuel stored by the first storage device;

storing a calculation result calculated by the first emission quantity computing device, by using a second storage device;

measuring a flow rate of fuel supplied to a product transport tank in the each transport device, by using a third measurement device;

measuring a flow rate of fuel supplied from the product transport tank in the each transport device to a product storage tank, by using a fourth measurement device;

calculating an environmentally influential substance of the fuel supplied to the product storage tank, based on the fuel flow rate measured by the third measuring device and the fuel flow rate measured by the fourth measuring device, and the emission quantity data of the environmentally influential substance stored by the second storage device, by using a second emission quantity computing device; and storing a calculation result calculated by the second emission quantity computing device, by using a third storage device.

6. The managing method according to claim 5, wherein the environmentally influential substance is carbon dioxide.

7. The managing method according to claim 5, further comprising:

computing the unit emission quantity of the environmentally influential substance emitted when the unit flow rate of fuel, supplied from the sales company to the customer, is manufactured or processed in the fuel-manufacturing device, by using a computing device based on an environmentally influential substance emissions per unit quantity of manufacture on a manufacturing device basis, and a quantity of the fuel supplied from a particular manufacturing device to a sales company;

wherein the storage device stores the unit emission quantity of the environmentally influential substance calculated in the computing of the unit emission quantity of the environmentally influential substance.

8. The managing method according to claim 5, further comprising displaying or printing the environmental emission quantity calculated by the computing device, of the unit emission quantity of the environmentally influential substance.

9. The managing method according to claim 8, further comprising saving data of sales date/time concerning a date of sale of the fuel to the customer, by using a storage device.

* * * * *